E. R. WAGNER.
BABY CARRIAGE.
APPLICATION FILED SEPT. 7, 1911.
1,221,396.
Patented Apr. 3, 1917.
3 SHEETS—SHEET 2.
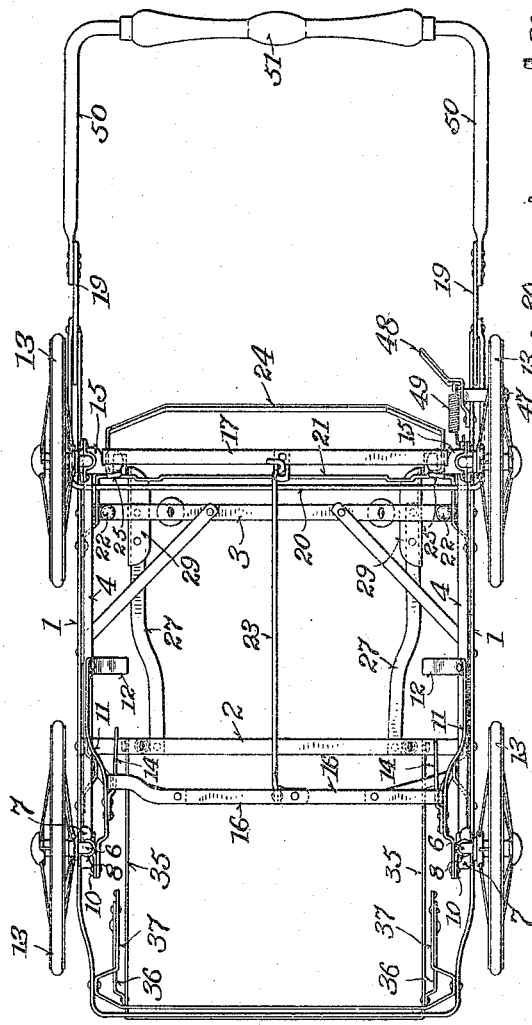
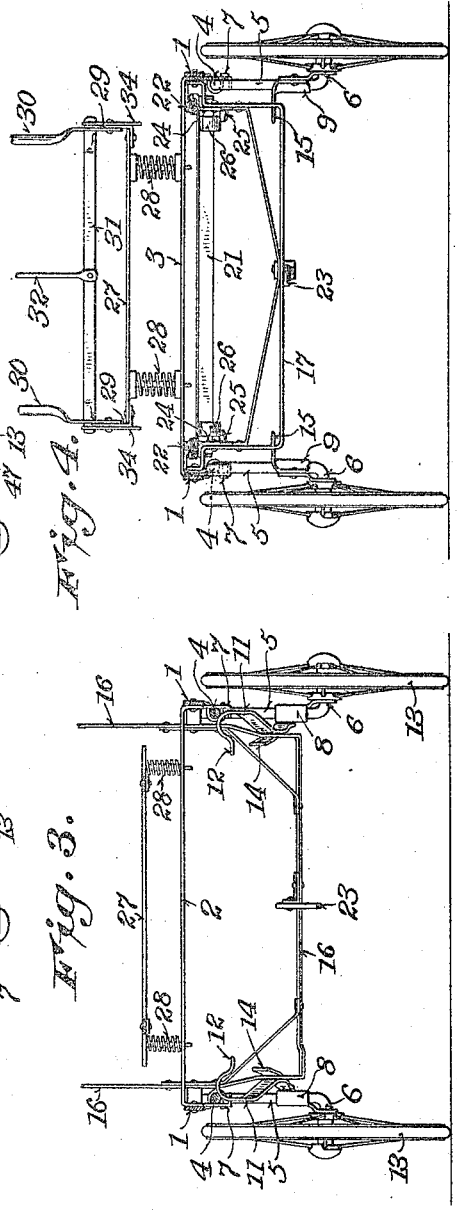

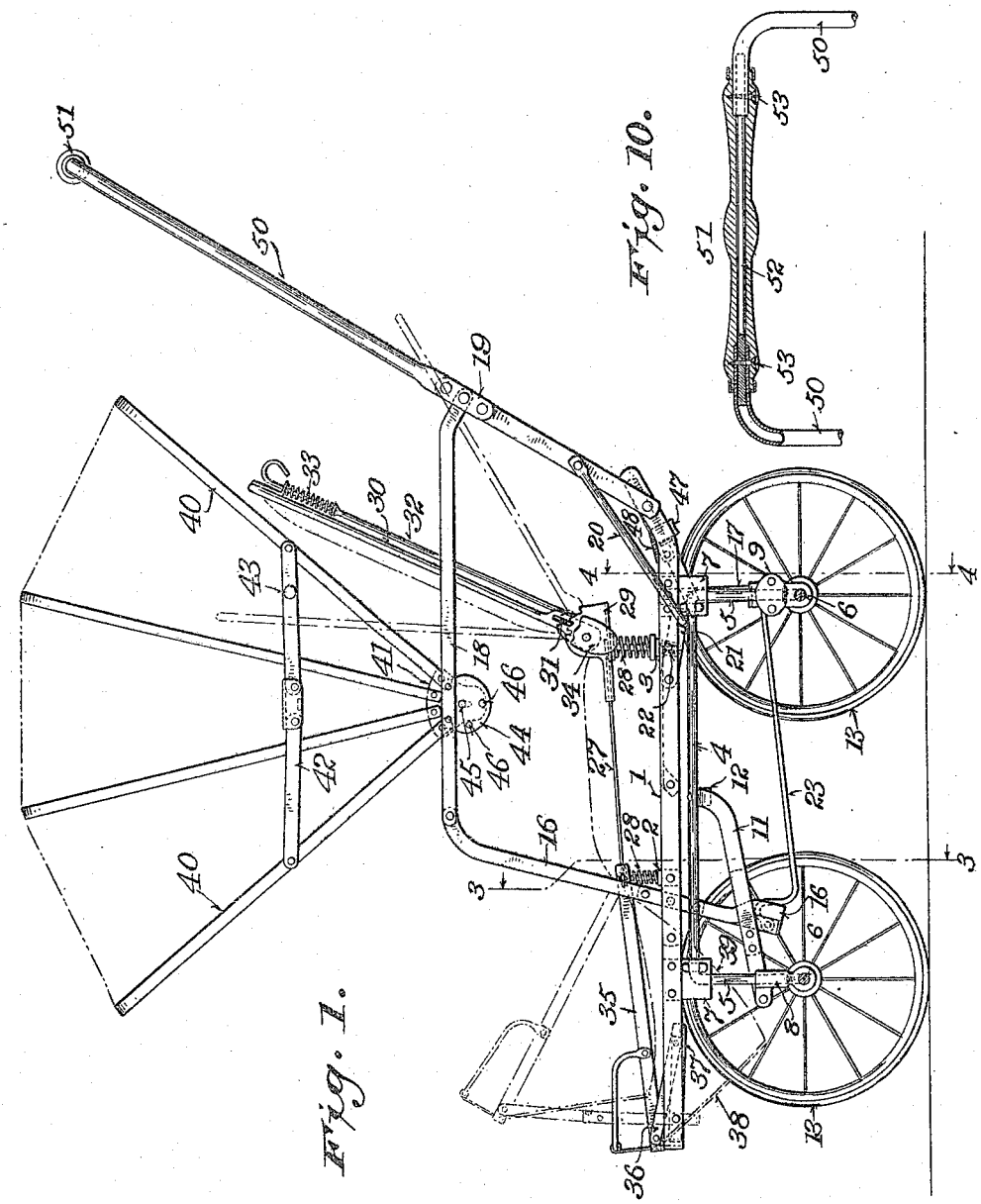

E. R. WAGNER.
BABY CARRIAGE.
APPLICATION FILED SEPT. 7, 1911.
1,221,396.
Patented Apr. 3, 1917.
3 SHEETS—SHEET 3.
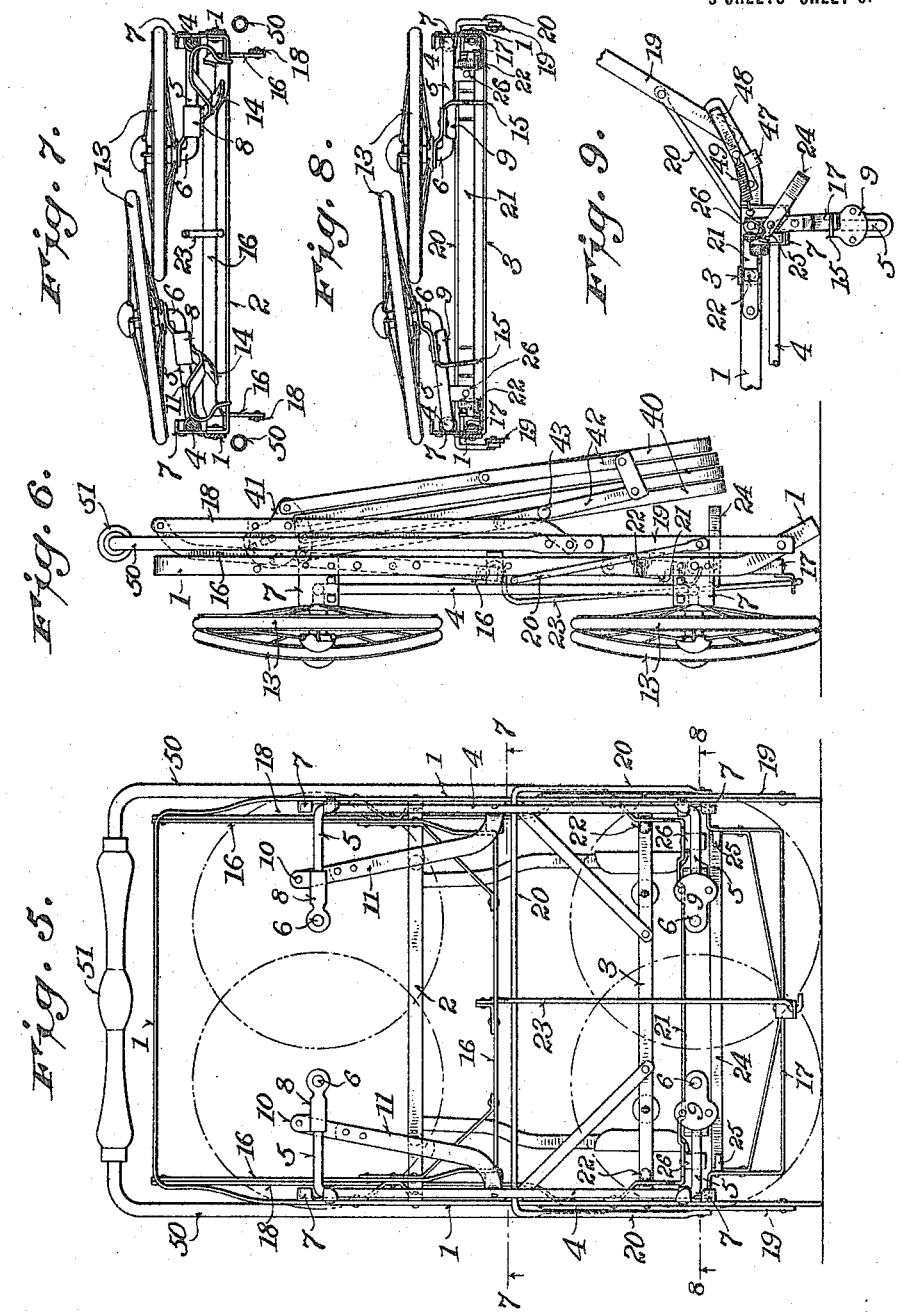

UNITED STATES PATENT OFFICE.

EDWARD R. WAGNER, OF MILWAUKEE, WISCONSIN, ASSIGNOR TO E. R. WAGNER MANUFACTURING COMPANY, OF NORTH MILWAUKEE, WISCONSIN, A CORPORATION OF WISCONSIN.

BABY-CARRIAGE.

1,221,396.

Specification of Letters Patent.

Patented Apr. 3, 1917.

Application filed September 7, 1911. Serial No. 648,053.

*To all whom it may concern:*

Be it known that I, EDWARD R. WAGNER, a citizen of the United States, residing at Milwaukee, in the county of Milwaukee and State of Wisconsin, have invented certain new and useful Improvements in Baby-Carriages, of which the following is a specification, reference being had to the accompanying drawing, forming a part thereof.

This invention relates more particularly to folding carriages.

Its main objects are to facilitate folding such carriages into small compass or compact form for transportation or storage when not in use and unfolding them into condition for use; to automatically brace and lock both the front and rear wheel supporting arms and the handle in place by the operation of unfolding the carriage; to provide for the adjustment of the foot rest and of the folding seat-back and top or canopy; and generally to produce a strong, light structure, and to improve the construction and increase the utility and convenience of carriages of this class.

It consists in the construction, arrangement and combination of parts as hereinafter particularly described and pointed out in the claims.

In the accompanying drawing like characters designate the same parts in the several figures.

Figure 1 is a side elevation of a folding baby carriage embodying the invention, the covering of the top or canopy and of the body being omitted, and the upholstery of the seat and back and the foot rest being indicated by dotted lines, and the wheels on the near side of the carriage being removed; Fig. 2 is an inverted plan view of the carriage spread or unfolded as it is shown in Fig. 1; Figs. 3 and 4 are vertical cross sections on the lines 3 3, and 4 4, Fig. 1; Fig. 5 is an inverted plan view of the carriage as folded, the wheels being omittted and their position indicated by dotted lines; Fig. 6 is a side elevation of the carriage as folded; Figs. 7 and 8 are cross sections on the lines 7 7 and 8 8, Fig. 5; Fig. 9 is a detail sectional view showing the releasing lever set in position to hold the latch or locking lever out of engagement with the handle brace; and Fig. 10 is a sectional detail of the handle.

The carriage comprises a main frame 1, preferably made as shown, of a metal band bent unto U shape and connected at intermediate points between its ends by cross pieces 2 and 3, which serve to brace and stiffen the frame and also to support the seat.

Wheel hangers 4, preferably consisting of round steel rods bent at approximately right angles into parallel wheel supporting arms 5 which terminate in outwardly bent spindles 6, are revolubly connected with the sides of the frame 1 parallel therewith, by depending plates or brackets 7 riveted or otherwise fastened to the sides of the frame and bent inwardly and notched at their lower ends, as shown in Fig. 5, to receive the arms 5 of the wheel hangers and to firmly brace them when they are inverted, against outward and forward and backward displacement.

Fittings 8 and 9, which may be conveniently stamped from sheet metal as shown, are secured on the arms 5 and form axles around the spindles 6 at their inner ends for the inner ends of the wheel hubs to bear against.

The fittings 8 are formed with forwardly projecting ears 10 to which the front ends of the inwardly, downwardly and forwardly inclined braces 11 are fastened, said braces being riveted or fastened to the hanger rods 4 between their bearings on the plates or brackets 7 and terminating in inwardly extending ends 12 for folding the hangers and wheels 13, as hereinafter explained.

The braces 11 are provided as shown in Figs. 2 and 3, with keepers 14, consisting of metal strips riveted or fastened thereto adjacent to their front ends and diverging therefrom rearwardly so as to coöperate with a U-shaped lever 16, as hereinafter explained, to lock and hold the wheel hangers near their front ends in unfolded or working position.

The plates or fittings 9 on the rear wheel supporting arms 5 are formed or provided as shown in Figs. 2 and 4, with inwardly extending notched projections 15, to coöperate with a U-shaped or bail-shaped stay 17, which is pivoted at its ends to the sides of the frame 1, to lock and hold the wheel hangers near their rear ends in unfolded or working position.

The stay lever 16, which serves not only to lock and hold the wheel hangers and front wheels in unfolded or working position as above stated, but also in coöperation with the inclined braces 11 and the inwardly extended ends 12 thereof, to fold and unfold the wheel hangers and wheels, is fulcrumed or pivoted to inwardly projecting brackets on the sides of the frame 1 and extended above said frame, its upper ends being connected by links 18 with the side bars 19 of a folding handle which is pivoted to the frame 1 at or adjacent to the rear end thereof. The links 18 are substantially parallel with the sides of the frame 1 so as to fold compactly with the stay lever 16 and handle.

The lower end of the stay lever 16 is bent rearwardly at its lower end on one side of the carriage, as shown in Figs. 1 and 2, so as to slightly retard or delay the folding of the wheel hanger and wheels on that side of the carriage and permit the folding of the hanger wheels on the opposite side of the carriage slightly in advance, thereby avoiding interference and causing the hanger and wheels on one side to fold between the frame 1 and the hanger and wheels on the opposite side, as shown in Figs. 7 and 8.

A U-shaped or bail-shaped brace 20 is pivoted at its ends to the side bars 19, and guided by its connecting cross piece between the sides of the frame 1 and the hangers 4. A locking bail or latch 21, pivoted at its ends to the sides of the frame 1, extends rearwardly underneath the cross piece 3 and is notched at the rear ends on each side, as shown in Figs. 1, 8 and 9, to engage with the cross piece of the brace 20 and thereby lock the handle and parts connected therewith in unfolded or operating position. Springs 22 interposed between the sides of said locking bail or latch and the cross piece 3 of frame 1, as shown in Figs. 1, 6 and 8, tend to hold said locking bail or latch in operative position to engage with the brace 20. The downward movement of the bail or latch 21 is limited by engagement with the hangers 4, as shown in Fig. 1. The cross piece of the lever and front stay 16 is connected with the cross piece of the rear stay 17 by a rod 23, so that by folding the handle bars 19 forwardly, both stays 16 and 17 will be simultaneously folded rearwardly.

A releasing bail or lever 24 pivoted to the stay 17 adjacent to its pivot connections with the frame 1, has inwardly bent notched ends 25, adapted when the carriage is unfolded and the cross piece of the bail or lever is depressed, to lift the locking bail or latch 21, and by engagement with the cross piece thereof to hold it in an elevated position, as shown in Fig. 9, thereby releasing the handle brace 20 and permitting the folding of the carriage.

The cross piece of the bail or latch 21 is provided with curved guides or projections 26, which in unfolding the carriage engage with the inturned ends 25 of the bail or lever 24 and guide them into their proper position underneath the bail or latch 21.

A seat frame 27 is mounted on the cross pieces 2 and 3 of the main frame 1, with springs 28 interposed between them. The side members of the seat frame are provided at their rear ends, as shown in Figs. 1 and 4, with upwardly projecting notched plates 29, to which is pivoted a folding back or back frame 30. The sides of the back frame are formed with longitudinal slots at their lower ends, in which are guided a transverse locking bar 31, adapted to engage at its ends with the notches in the plates 29 and to lock and hold the back in different positions, as indicated in Fig. 1. An operating rod 32 connected at its lower end with the bar 31 is provided at its upper end with a loop or finger piece, and is guided in a bearing on the back. A spring 33 interposed between said bearing and a collar on the rod, tends to hold the bar 31 in engagement with the notched plates 29.

As shown in Fig. 4, slotted guard plates 34, through which the ends of the bar 31 project, are pivotally connected with the outer sides of the notched plates 29 by the pivot pins or rivets of the back or back frame 30. These guard plates, omitted in Fig. 1 to more clearly show the notched plates 29, project outwardly beyond the notched edges of said plates 29, thereby preventing clothing from catching thereon or injury to the fingers in folding and unfolding the carriage or adjusting the back.

A folding and adjustable bail-shaped foot rest supporting frame 35 is pivoted at its ends to the front end of the seat frame 27 and is connected at its front end by jointed braces 36 and 37 with the sides of the frame 1, as shown in Figs. 1 and 2. The lower members 37 of the jointed folding braces are preferably connected at their lower ends as shown in Fig. 2, so as to more firmly support the foot rest frame and foot rest at the front end parallel with the front cross piece of the frame 1. When the braces are folded the foot rest frame rests at its front end upon the front end of the frame 1, as shown by full lines in Fig. 1. When they are unfolded the frame with the foot rest is supported in an elevated position as indicated by dotted lines in the same figure. The front and upper end of the foot board or rest 38 indicated by dotted lines in Fig. 1, is hinged or flexibly connected with the cross piece at the front end of the frame 35, and is connected at its lower end by a flexible apron 39 of cloth or other suitable material with the front of the seat frame 27.

The carriage is provided with a folding and adjustable top or canopy comprising bows 40 which are pivoted at their ends to plates 41. The front and back bows are connected by jointed folding braces 42 provided with outwardly projecting handles 43 which may be arranged as shown in Fig. 6 to bear against the links 18 and thus serve as stops or rests for the top when it is folded and turned back. The plates 41 are vertically slotted and pivoted to plates 44 attached to the links 18, the pivot pins 45 which are fastened in the plates 44, passing through the slots in plates 41 and thus permitting the plates 41 to be shifted edgewise up and down on the pivot pins and the top to be turned forward and back into different positions.

The plates 41 are formed with notches in their lower edges which are rounded and the plates 44 are provided with inwardly projecting pins or studs 46, with which the notches are engaged to hold the top in its different positions.

The covering of the top or canopy is indicated by dotted lines in Fig. 1, and the upholstery of the seat and back is also indicated in the same manner.

In practice, the sides of the carriage between the sides of the frame 1 and the links 18 which serve as arm rests, are closed by curtains of cloth or similar material, and the triangular spaces at the ends of the foot rest between the frame 35, foot board 38 and apron 39, are closed in like manner.

As shown in Figs. 1, 3 and 9, the carriage is provided with a brake shoe 47, attached to a foot lever 48 which is pivoted to one side of the frame 1 and connected therewith by a spring 49, so arranged as to hold the brake in its on and off positions.

To fold the carriage, the top braces 42 are bent upwardly, the bows 40 folded together and then turned back as shown in Fig. 6, the top being first lifted slightly to disengage the notches in the plates 41 from the pins or studs 46. The back is folded forward upon the seat, the locking bar 31 being disengaged from the notched plates 29 by pulling upwardly on the rod 32. The releasing bail or lever 24 is depressed with the foot into the position shown in Fig. 9, thereby lifting the latch 21 and temporarily locking it out of engagement with the handle brace 20. The handle being grasped in one hand and the front cross piece of the frame 1 with the other, are brought together as shown in Fig. 6. In this operation the stays 16 and 17 are folded backward, thereby releasing the wheel hangers and permitting them to be folded inwardly with the wheels, as shown in Figs. 6, 7 and 8, by the engagement of the front stay 16 with the inwardly projecting ends 12 of the braces 11.

To unfold and erect the carriage, the reverse of the foregoing operations is performed. The handle 19 is turned on its pivots away from the frame 1, thereby swinging the stays 16 and 17 downward and forward with respect to the frame 1. The front brace 16 engaging with the inclined braces 11, unfolds the wheel hangers and wheels, turning the wheel supporting arms 5 downwardly and outwardly against the inner sides of the plates 7 and into the notches in their inturned lower edges, thereby bracing them against outward, forward and backward displacement. The front brace 16 passing between the braces 11 and keepers 14, locks the front arms 5 and further braces them against inward and outward displacement. The rear brace 17 passing into the notches in the projections 15 as shown in Figs. 3 and 4, locks and braces the rear arms 5 against inward and outward displacement. The wheel hangers and wheels are thus rigidly locked and held in place when they are unfolded into working position.

As the handle brace 20 is drawn rearwardly between the sides of the frame 1 and the hangers 4, it passes underneath and lifts the latch 21, which as soon as the handle is brought to its normal working position, is forced by the springs 22 into engagement with the cross piece of the brace, thereby securely locking and holding the several folding members connected with and operated by the handle, in operative position, as shown in Fig. 1. As the rear brace 17 is swung downwardly and forwardly into engagement with the notched plates 15, the ends of the releasing bail or lever 24 are directed by the curved guides 26 on the latch 21 underneath the cross piece of said latch, as shown in Figs. 3 and 4, into position to lift the latch by depressing the cross piece of said bail or lever in the manner above explained, whenever it is desired to fold the carriage.

The folding handle is preferably constructed as shown by Fig. 10 in connection with Figs. 1 and 2.

The side bars are partly made of tubular sections 50, which are bent inwardly at their outer ends and fitted into the bore of a hollow or tubular grip 51, which is made of wood or other suitable material.

The grip is reinforced and the several parts are secured together by a metal tie rod 52 passing through the grip 51 and fitting at its ends into the inturned ends of the tubular side bar sections 50, in which they are fastened by pins or screws 53 passing transversely through them and the grip.

Various modifications in the construction and arrangement of parts of the carriage may be made without materially affecting the operation of the folding, locking and bracing devices herein set forth, and without departing from the principle of the invention.

I claim:

1. In a baby carriage the combination of a frame, inwardly folding wheel hangers consisting of rods revolubly connected with the sides of said frame parallel therewith and bent at right angles into parallel arms which are in turn bent at right angles into wheel spindles, inwardly, downwardly and forwardly inclined braces attached at their front ends to the front arms and adjacent to their rear ends to said rods beyond which they extend inwardly and provided adjacent to their front ends with keepers diverging rearwardly and inwardly therefrom, a handle pivoted to the rear end of said frame, and an inverted U-shaped stay lever pivoted to the sides of said frame and connected at its ends by links with said handle, said lever being adapted by coöperation with said inclined braces to automatically fold and unfold said hangers when the handle is folded and unfolded and when said hangers are unfolded to engage with said keepers and lock said front arms in place.

2. In a baby carriage the combination of a frame provided on the sides with depending brackets inwardly bent and notched at their lower ends, inwardly folding wheel hangers consisting of rods revolubly connected with said brackets parallel with the sides of said frame and bent into arms which are provided at their ends with wheel spindles and which when unfolded bear against said brackets and fit into the notches therein, and means for fastening said hangers in unfolded position.

3. In a baby carriage the combination of a frame provided with depending brackets having inwardly bent and notched lower ends, inwardly folding wheel hangers consisting of rods revolubly connected with the inner sides thereof and bent adjacent thereto into arms which are provided at their ends with wheel spindles and which when unfolded bear outwardly against said brackets and fit into the notches therein, and U-shaped stays pivoted to the sides of the frame and adapted to lock said hangers in unfolded position.

4. In a baby carriage the combination of a frame, inwardly folding wheel hangers consisting of rods revolubly connected with the sides of said frame parallel therewith and having lateral wheel supporting arms, folding stays pivoted to the sides of said frame and adapted when unfolded to hold said wheel supporting arms in working position, a folding handle pivoted to said frame and connected by links with upwardly extended arms of the front stay, a rod connecting the lower part of the front stay with the lower part of the rear stay, a bail-shaped brace pivoted at its ends to said handle and guided by its cross piece between the hanger rods and the sides of the frame, and a latch pivoted to said frame and adapted by engagement with said handle brace to lock the handle and parts operatively connected therewith in working position.

5. In a baby carriage the combination of a frame, inwardly folding wheel hangers hinged to the sides of said frame, a folding stay pivoted to the frame and adapted when unfolded to hold said hangers in working position, a folding handle pivoted to the frame and operatively connected with said stay, a brace pivoted to said handle and guided in folding and unfolding between the sides of the frame and the wheel hangers, a spring pressed latch pivoted to the frame and adapted by engagement with said brace to lock the handle and parts connected therewith in working position, and a releasing lever pivoted to said stay and adapted to disengage said latch from said brace preparatory to folding the carriage.

6. In a baby carriage the combination of a frame, inwardly folding wheel hangers connected with said frame, a folding bail-shaped stay pivoted to said frame and adapted when unfolded to hold said hangers in working position, a folding handle pivoted to said frame and operatively connected with said stay, a bail-shaped brace pivoted at its ends to the side bars of the handle and guided lengthwise of the frame in folding and unfolding, a bail-shaped spring pressed latch pivoted to the sides of the frame and adapted to automatically engage with the cross piece of said brace and to lock the handle and connected parts in working position when the carriage is unfolded, and a bail-shaped releasing lever pivoted to said stay and adapted to disengage said latch from said brace preparatory to folding the carriage.

In witness whereof I hereto affix my signature in presence of two witnesses.

EDWARD R. WAGNER.

Witnesses:
ROBERT N. DEDI,
EDW. F. QUICK, Jr.

Copies of this patent may be obtained for five cents each, by addressing the "Commissioner of Patents, Washington, D. C."